US008162300B2

(12) United States Patent
Kaiser et al.

(10) Patent No.: US 8,162,300 B2
(45) Date of Patent: Apr. 24, 2012

(54) CLAMPING DEVICE

(75) Inventors: Richard Kaiser, Bad Homburg (DE); Peter Schauss, Florsheim (DE)

(73) Assignee: DE-STA-CO Europe GmbH (DE)

( * ) Notice: Subject to any disclaimer, the term of this patent is extended or adjusted under 35 U.S.C. 154(b) by 476 days.

(21) Appl. No.: 12/227,306

(22) PCT Filed: May 16, 2007

(86) PCT No.: PCT/DE2007/000893

§ 371 (c)(1),
(2), (4) Date: Apr. 27, 2009

(87) PCT Pub. No.: WO2007/131499

PCT Pub. Date: Nov. 22, 2007

(65) Prior Publication Data

US 2009/0224455 A1 Sep. 10, 2009

(30) Foreign Application Priority Data

May 17, 2006 (DE) ......................... 10 2006 022 950

(51) Int. Cl.
*B23Q 3/08* (2006.01)

(52) U.S. Cl. ............................... 269/32; 269/24; 269/27

(58) Field of Classification Search .................... 269/32, 269/20, 24–27, 228
See application file for complete search history.

(56) References Cited

U.S. PATENT DOCUMENTS

| | | | | |
|---|---|---|---|---|
| 5,118,088 | A | 6/1992 | Sawdon | |
| 5,676,357 | A * | 10/1997 | Horn | 269/32 |
| 5,816,567 | A * | 10/1998 | Horn | 269/32 |
| 5,845,897 | A * | 12/1998 | Tunkers | 269/32 |
| 6,279,887 | B1 * | 8/2001 | Glasenapp et al. | 269/32 |
| 6,416,045 | B1 * | 7/2002 | Morroney | 269/32 |
| 6,427,992 | B1 | 8/2002 | Noda et al. | |
| 7,121,539 | B2 * | 10/2006 | McCormick et al. | 269/239 |
| 7,669,840 | B2 * | 3/2010 | Xu et al. | 269/32 |
| 2002/0043751 | A1 * | 4/2002 | Colby | 269/32 |
| 2004/0041324 | A1 * | 3/2004 | Fukui | 269/32 |
| 2004/0195750 | A1 * | 10/2004 | Migliori | 269/216 |
| 2005/0121843 | A1 | 6/2005 | Maffeis | |
| 2009/0224455 | A1 * | 9/2009 | Kaiser et al. | 269/216 |

FOREIGN PATENT DOCUMENTS

| | | | |
|---|---|---|---|
| DE | 10 2005 005340 | A1 | 10/2005 |
| EP | 1 201 369 | A | 5/2002 |

* cited by examiner

*Primary Examiner* — Lee D Wilson
(74) *Attorney, Agent, or Firm* — Harness, Dickey & Pierce, P.L.C.

(57) ABSTRACT

A clamping device has a top part (1) provided with an adjusting mechanism for a clamping arm that can be pivoted into a clamping position and an opening position on the top part (1). A housing (7) carries the top part (1). The housing has an inner region to receive a linearly mobile adjusting rod that is connected, at one end, to the adjusting mechanism (3) and to a drive, at the other end, arranged in the housing (7). The housing (7) has an extruded hollow profiled element (8). The inner region of the extruded element (8) has a uniform inner cross-section over its entire length.

15 Claims, 3 Drawing Sheets

CLAMPING DEVICE

CROSS-REFERENCE TO RELATED APPLICATIONS

This application is a National Stage of International Application No. PCT/JP2006/012151, filed Dec. 16, 2006, which claims priority to DE 20 2006 000 908.6, filed Jan. 19, 2006 and DE 20 2006 016 392.1, filed Oct. 26, 2006. The disclosures of the above applications are incorporated herein by reference.

FIELD

The present disclosure pertains to a clamping device for fixing work pieces and particularly, to a clamping device with a clamping arm that is arranged on a housing in a pivoted fashion. The clamping arm can be moved into the clamping position of the work piece to be fixed and once again pivoted back from this position by an adjusting mechanism that is actuated by a drive.

BACKGROUND

Clamping devices of the aforementioned type are known in many different variations. One such variation is disclosed in DE 10 2005 005 340 A1. It has a top part with an adjusting mechanism for a clamping arm that can be pivoted into a clamping position and an opening position on the top part. A housing carries the top part and features an interior to accomodate a linearly movable adjusting rod. The adjusting rod is connected to the adjusting mechanism on one end and to a drive arranged in the housing on the other end. The clamping device according to U.S. Pat. No. 5,118,088 A is also based on a similar design. Here, the housing and the top part are manufactured of a profiled section including bores of different diameters. The bores realize a cylinder chamber for a piston drive of the adjusting rod, a guide for the piston rod of smaller diameter and a guide region of slightly larger diameter for the end of the adjusting rod. In another embodiment of the clamping device, illustrated in FIG. 18 of U.S. Pat. No. 5,118,088 A, the housing is one piece including a cylindrical bore except for a remaining bottom structure. The adjusting mechanism is contained in the top part. The clamping arm, connected to the adjusting mechanism, is also arranged on the top part. The top part features an extension that fits into the cylindrical bore of the housing. It has a length that approximately corresponds to half the length of the housing. The extension serves to seal the cylinder chamber and to guide the adjusting rod. In both above-described embodiments, the starting material for the housing consists of an extruded profile that corresponds to the external shape of the housing of the clamping device. It requires complicated internal processing, such as an extruded profile of solid material.

SUMMARY

A clamping device has a clamping arm that is arranged on a housing in a pivoted fashion. It can be moved into the clamping position of the work piece and once again pivoted back from this position by an adjusting mechanism that is actuated by a drive. The disclosure aims to lower the expenditures for constructing and manufacturing such a clamping device.

According to the disclosure, the objective is achieved by providing a housing in the form of an extruded hollow profile. The interior of the housing has a constant inner cross section over its entire length.

In other words, the disclosure eliminates the expenditures for the subsequent boring work that was described above with reference to the prior art. It serves to produce the internal cavities of the housing. These expenditures are also disproportionate to the requirements for adapting the hollow extruded profile that is cut to a corresponding length and effectively forms the basic component for the clamping devices. Its functional requirements will be described in greater detail below in the specific portion of the description. The hollow extruded profile that is cut to the required length with corresponding dimensions represents a basic component for the manufacture of a clamping device. The unobstructed interior available in the hollow extruded profile also provides an advantageous option of fitting the to be manufactured clamping device with different drives for the movement of the adjusting rod and with elements to automatically determine the clamping arm positions. Also, it is possible to attach different top parts to the hollow profile. The top parts only need to be adapted to the hollow profile on the end where they are to be connected. They feature an adjusting mechanism that can be connected to the end of the adjusting rod.

Other objects and advantages of the disclosure of the clamping device will become apparent to those skilled in the art.

DRAWINGS

The clamping device, as well as the advantageous additional developments defined in the claims, are described in greater detail below with reference to the graphical representation of different embodiments.

DETAIL DESCRIPTION

Figure 1:
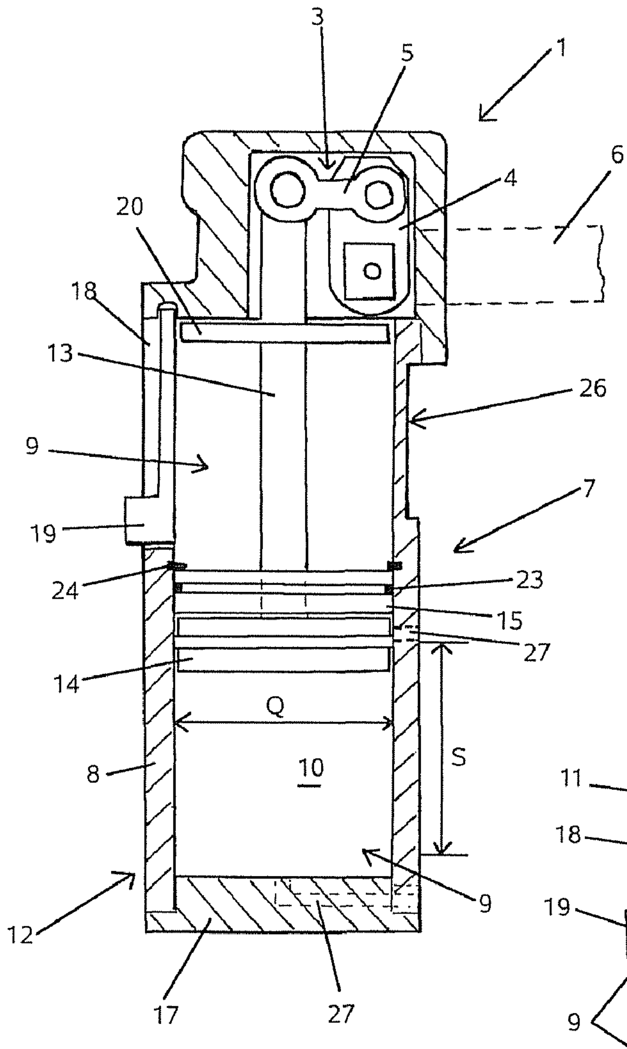
FIG. 1 is a sectional view through a clamping device with a clamping arm in the clamping position.

The clamping device described below includes a top part 1 with an adjusting mechanism 3. The adjusting mechanism 3 is for a clamping arm 6 that is arranged on the top part 1 in a pivotal fashion. In the described embodiment, the clamping arm 6 is seated on square pins 22 that protrude from both sides of the top part. The clamping arm 6 can be turned into the clamping and opening positions, (see FIGS. 1 and 2), by turning the square pins 22, accordingly. The top part 1 is arranged on a housing 7 together with its adjusting mechanism 3 and clamping arm 6. The interior 9 of the housing 7 accommodates a linearly movable adjusting rod 13. The adjusting rod 13 is connected to the adjusting mechanism 3 at one end and to a drive 12, arranged in the housing 7, at the other end.

All these components can be assembled into a clamping device and rigidly connected to one another by suitable and corresponding connecting elements that naturally are not individually illustrated in the figures. This applies analogously to any screw openings in the housing 7 to mount the clamping device on a not-shown carrier or holder.

According to FIGS. 1 to 5, it is important that the housing 7 is in the form of a hollow extruded profile 8. The interior 9 of the profile 8 has a constant inner cross section Q over its entire length L. Thus, the housing 7, in the form of a hollow extruded profile 8, effectively forms a basic component for the construction of the entire clamping device.

Figure 2:
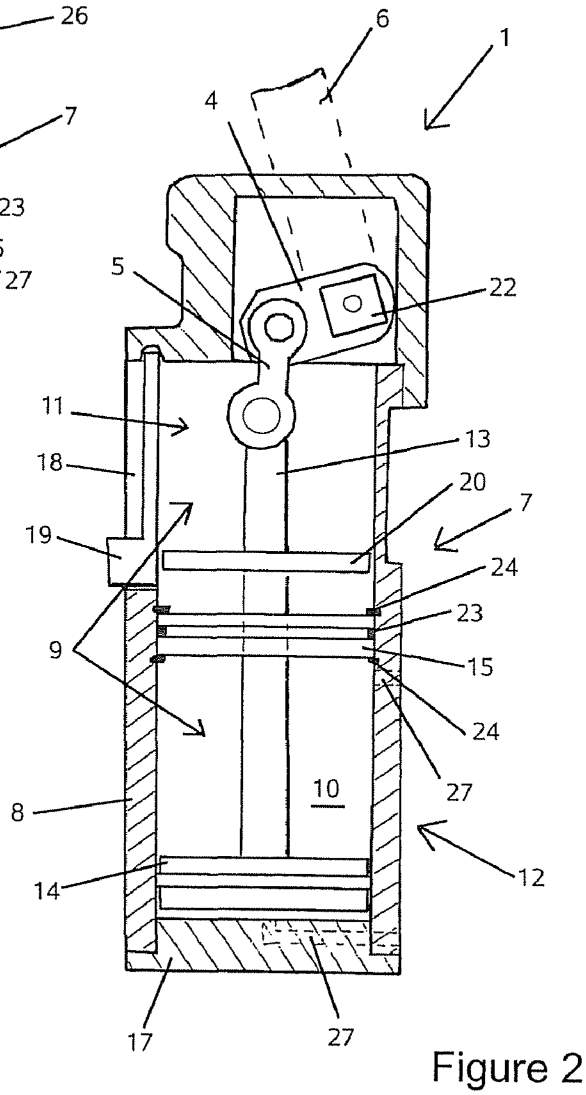
FIG. 2 is a sectional view of the device according to FIG. 1 with the clamping arm in an opening position.
Figure 3:
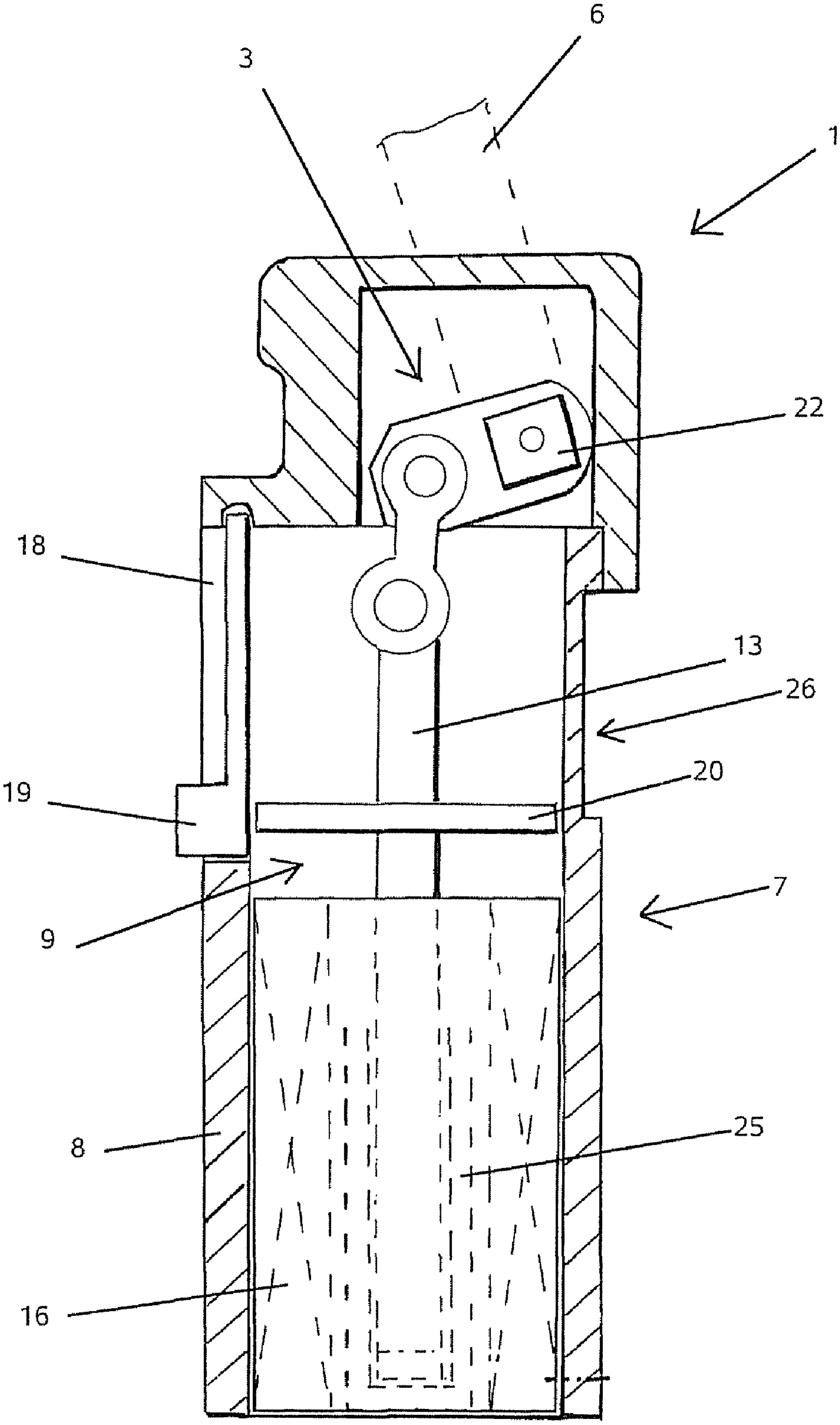
FIG. 3 is a sectional view of the clamping device with an alternative drive.
Figure 4:
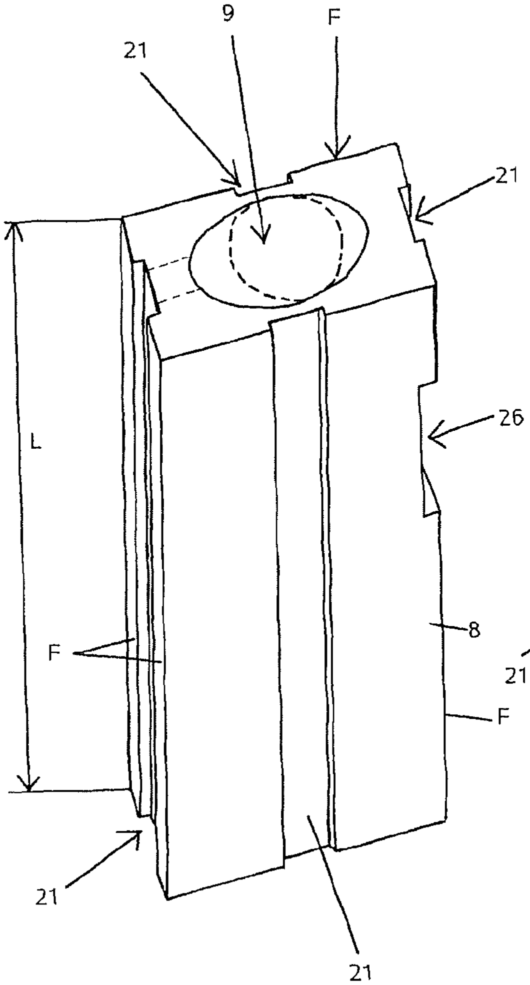
FIG. 4 is a perspective view of one embodiment of a hollow extruded profile.
Figure 5:
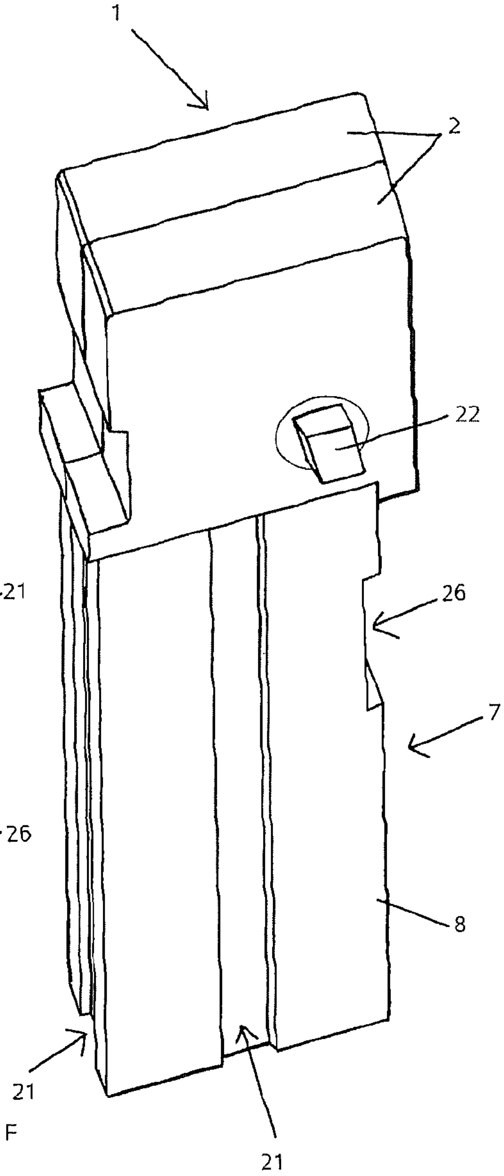
FIG. 5 is a perspective view of the hollow extruded profile of FIG. 4 with an attached top part.

According to the embodiment illustrated in FIG. 4, the hollow extruded profile 8 preferably has a rectangular outer cross section. The embodiment shown is, however, by no means mandatory. The hollow extruded profile 8 could also, for example, have a square or even a circular cross section. The inner cross section Q may be selected as in a circular, elliptical (see FIG. 4) or even rectangular configuration. For simplicity reasons, a circular inner cross section is indicated by broken lines in FIG. 4. The inventive extruded hollow profile 8 may also be provided with connecting elements that are in the form of grooves 21. The grooves can be produced during the extrusion process on the profile 8 outside surface, particularly on its flank surfaces F. If the groove 21 includes a transverse groove 26 as illustrated in FIGS. 1 to 5, the transverse groove 26 needs to be subsequently machined into the hollow extruded profile 8.

The top part 1 is relatively short and small in comparison with the overall length L of the hollow extruded profile 8. The top part 1 houses the adjusting mechanism 3. The hollow extruded profile of the top part 1, according to FIGS. 1 to 3 and 5, is in the form of a cap. The top part 1 includes an at least partially open side. The partially open side of the top part 1 is arranged on an open end of the extruded profile 8. The top part is rigidly connected to the hollow extruded profile 8 in a suitable fashion. According to FIG. 2, the at least partially open side of the cap ensures that the so-called drag element 5, that forms part of the adjusting mechanism 3, can move in and out of the short top part 1 and penetrate into the extruded profile 8. Consequently, the body of the hollow extruded profile 8 or the actual housing 7 of the clamping device advantageously remains unaffected by the accommodation of the adjusting mechanism 3. The adjusting mechanism includes a lever arm 4, a not-shown adjusting shaft with its protruding square pins 22 and the drive element 5. In order to simplify, the installation of the adjusting mechanism 3, the top part 1 is made up of two top part elements 2. The top part elements 2 are in the form of shells and can be rigidly connected to one another by suitable means.

The end positions of the clamping arm 6 typically need to be determined in such clamping devices. Thus, the attachment of a suitable sensor arrangement 19 can be simplified. This occurs by providing the end of the hollow extruded profile 8 on the side of the top part with a lateral opening 18. The opening 18 can be easily cut or milled into the extruded profiles and used to accommodate a sensor arrangement 19. A slot-like opening 18 is preferably arranged in the region of one of the grooves 21. In order to actually determine the clamping arm position, the adjusting rod 13 is provided with a displacement transducer 20. The transducer 20 consequently participates in the upward and downward movement. This means that the top part 1 advantageously remains completely unaffected by the customary installation of such a sensor arrangement 19. Thus, such an installation is limited to the hollow extruded profile 8 only.

The housing 7 is formed by a hollow extruded profile 8 of any desired length that is cut to the required dimensions. The hollow extruded profile is also closed by the top part 1 on one end. The distant end of the hollow extruded profile 8 away from the top part is also provided with a suitable cover. A corresponding cover element 17 is illustrated in FIG. 1 and 2.

The overall length L of the hollow extruded profile 8 essentially and preferably corresponds to at least twice the length of the required adjusting distance S. The adjusting distance S is correspondingly converted by the adjusting mechanism 3 for the required pivoting movement of the clamping arm 6 from the opening position (FIG. 2) into the clamping position (FIG. 1) and vice versa. The interior 9 of the housing 7 or in the hollow extruded profile 8 is clearly structured such that it is possible to choose the respective drive 12 for the adjusting rod 13. The entire interior 9 remains clear of any installations or cross-sectional constrictions. The drive 12 is typically arranged in the lower part or in the distant part, away from the top part, of the interior 9 of the hollow extruded profile 8. The drive 12 may be in the form of a pneumatic, hydraulic or electric drive. At this point, it should also be noted that the shown adjusting mechanism 3 should merely be interpreted as an example. It is also possible to utilize other adjusting mechanisms (e.g. so-called plane-motion direct-contact mechanisms—see DE 10 2004 007 465 A1).

When using a hydraulic or pneumatic drive, an intermediate wall 15, penetrated in a sealed fashion by the adjusting rod 13, is arranged in a sealed fashion in the interior 9 of the hollow extruded profile 8. The wall 15 defines an upper limit of the piston-swept volume 10 for a piston 14 that is connected to the adjusting rod 13. The lower opening of the extruded profile 8 needs to be closed in this case with the above-mentioned cover (cover element 17) in order to also tightly seal the piston-swept volume toward the bottom, as shown in FIGS. 1 and 2.

The intermediate wall 15 inserted into the hollow extruded profile 8 needs to be fixed and sealed. The intermediate wall 15 is provided with a ring seal 23 and is fixed on one or both sides by holding elements 24, that are merely indicated in the figures.

The supply lines for a suitable operating fluid are merely indicated with a broken lines in FIGS. 1 and 2. They are identified by the reference symbol 27 in these figures. They do not require a specific description in this respect.

When using an electric drive as shown in FIG. 3, a rotating shaft of the electric drive is in the form of a reversing motor 16. It is functionally connected to the adjusting rod 13 via a converter 25. The converter 25 converts a rotational movement into a linear movement. This is, however, merely indicated with broken lines in FIG. 3. Reversing motors 16 of this type, that can rotate in two directions, and corresponding converters 25 are well known and therefore do not require a specific description in this respect.

When using such an electric drive, it is possible to also close the bottom end of the hollow extruded profile 8 with a cover element 17. Also, the design could include the not-shown outer housing of the electric drive or the reversing motor 16 that forms the seal of the hollow extruded profile 8 on the distant end away from the top part.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

The invention claimed is:

1. A clamping device comprising:

a top part with an adjusting mechanism for a clamping arm, the clamping arm can be pivoted into a clamping position and an opening position on the top part;

a housing having a first end for carrying the top part and a second end including a bottom portion;

an interior in said housing for accommodating a linearly movable adjusting rod, said adjusting rod is connected to the adjusting mechanism on one end;

a drive arranged in the housing, said drive connected with an other end of the adjusting rod; and a hollow extruded profile having a desired length forming said housing, said interior having a constant inner cross section over the entire length from the top part to the bottom portion such that the adjusting mechanism can move in and out of the top part and penetrate into the interior of the hollow extruded profile that forms the housing.

2. The clamping device according to claim 1, wherein the hollow extruded profile has a rectangular outer cross section.

3. The clamping device according to claim 1, wherein the inner cross section is selected with a circular or oval configuration.

4. The clamping device according to claim 1, wherein an outside surface of the hollow extruded profile includes connecting elements in the form of grooves.

5. The clamping device according to claim 1, wherein the top part containing the adjusting mechanism is in the form of a cap.

6. The clamping device according to claim 1, wherein the top part includes an at least partially open side arranged on an open end of the extruded profile.

7. The clamping device according to claim 1, wherein the top part is formed by two shell-shaped top part elements.

8. The clamping device according to claim 1, wherein the hollow extruded profile includes a lateral opening in order to accommodate a sensor arrangement for determining end positions of said clamping arm.

9. The clamping device according to claim 1, wherein the adjusting rod is provided with a displacement transducer.

10. The clamping device according to claim 1, wherein a distant end of the hollow extruded profile, away from the top part, is closed by a cover element.

11. The clamping device according to claim 1, wherein a drive is arranged in a lower part of the interior of the hollow extruded profile, said drive is selected from a pneumatic, hydraulic or electric drive.

12. The clamping device according to claim 11, wherein a hydraulic or pneumatic drive is used, and an intermediate wall, penetrated in a sealed fashion by the adjusting rod, is arranged in a sealed fashion in the interior of the hollow extruded profile in order to define an upper limit of piston-swept volume for a piston connected to the adjusting rod.

13. The clamping device according to claim 11, wherein an electric drive is used, and a rotating shaft of the electric drive is in the form of a reversing motor functionally connected to the adjusting rod via a converter for converting a rotational movement into a linear movement.

14. The clamping device according to claim 13, wherein the housing of the electric drive forms a seal with the hollow extruded profile at the distant end from the top part.

15. The clamping device according to claim 1, wherein an overall length of the hollow extruded profile essentially corresponds to at least twice a length of an adjusting distance required for pivoting the clamping arm from the opening position into the clamping position by the adjusting mechanism.

* * * * *